United States Patent
Bendtsen

(10) Patent No.: US 6,745,471 B2
(45) Date of Patent: Jun. 8, 2004

(54) BEVEL GEAR BEARING SUPPORT ARRANGEMENT MANUFACTURING METHOD

(75) Inventor: Randall Rey Bendtsen, Peoria, IL (US)

(73) Assignee: Caterpillar Inc, Peoria, IL (US)

( * ) Notice: Subject to any disclaimer, the term of this patent is extended or adjusted under 35 U.S.C. 154(b) by 236 days.

(21) Appl. No.: 10/025,502

(22) Filed: Dec. 26, 2001

(65) Prior Publication Data

US 2003/0029041 A1 Feb. 13, 2003

Related U.S. Application Data

(60) Provisional application No. 60/311,120, filed on Aug. 10, 2001.

(51) Int. Cl.[7] .............................. B21D 53/10; F16H 1/20
(52) U.S. Cl. ............................... 29/898.07; 29/898.06; 29/898.09; 29/893.1; 29/893.2; 29/469; 74/424; 74/606 R; 384/563
(58) Field of Search .............................. 29/469, 898.07, 29/898.09, 893.1, 893.2, 898.06; 74/444, 423, 424, 606 R; 475/246, 230, 247; 384/517, 563

(56) References Cited

U.S. PATENT DOCUMENTS

| | | | |
|---|---|---|---|
| 2,548,258 A | * 4/1951 | Bain | 475/245 |
| 2,609,710 A | 9/1952 | Osborn | |
| 2,651,216 A | * 9/1953 | Alden | 475/247 |
| 2,762,112 A | 9/1956 | Kylen | |
| 3,708,857 A | * 1/1973 | Pfeiffer | 29/407.05 |
| 3,785,023 A | 1/1974 | Harbottle | |
| 3,838,751 A | * 10/1974 | Brown | 184/6.12 |
| 4,492,018 A | 1/1985 | Rode | |
| 4,611,935 A | * 9/1986 | Rode | 384/548 |
| 5,125,156 A | 6/1992 | Witte | |
| 5,267,489 A | * 12/1993 | Ziech | 74/606 R |
| 5,289,635 A | 3/1994 | Martin et al. | |
| 5,293,686 A | * 3/1994 | Martin et al. | 29/893.1 |
| 5,415,598 A | * 5/1995 | Sawase et al. | 475/86 |
| 5,620,388 A | 4/1997 | Schlegelmann et al. | |
| 5,697,677 A | * 12/1997 | Ruppert et al. | 301/124.1 |
| 5,975,867 A | 11/1999 | Grant et al. | |
| 6,004,040 A | 12/1999 | Rode | |
| 6,024,666 A | * 2/2000 | Bunnow | 475/230 |
| 6,093,127 A | * 7/2000 | DiDomenico et al. | 475/230 |
| 6,485,389 B1 | * 11/2002 | Bell et al. | 475/230 |
| 6,491,126 B1 | * 12/2002 | Robison et al. | 180/233 |

FOREIGN PATENT DOCUMENTS

FR  2630172  * 10/1989

* cited by examiner

Primary Examiner—David P. Bryant
Assistant Examiner—Eric Compton
(74) Attorney, Agent, or Firm—Finnegan, Henderson, Farabow, Garrett & Dunner; Steve M Hanley

(57) ABSTRACT

A method of manufacturing involves providing a sub-unit including a shaft and a bevel gear associated with the shaft, and also providing a first support member and a second support member. A first bearing is positioned between the sub-unit and first support member. A second bearing is positioned between the second support member and the sub-unit. The first support member is connected to the second support member. Preload on the first and second bearings is adjusted. At least the sub-unit, the first support member, the second support member, the first bearing, and the second bearing constitute an assembly capable of being installed in a housing.

20 Claims, 5 Drawing Sheets

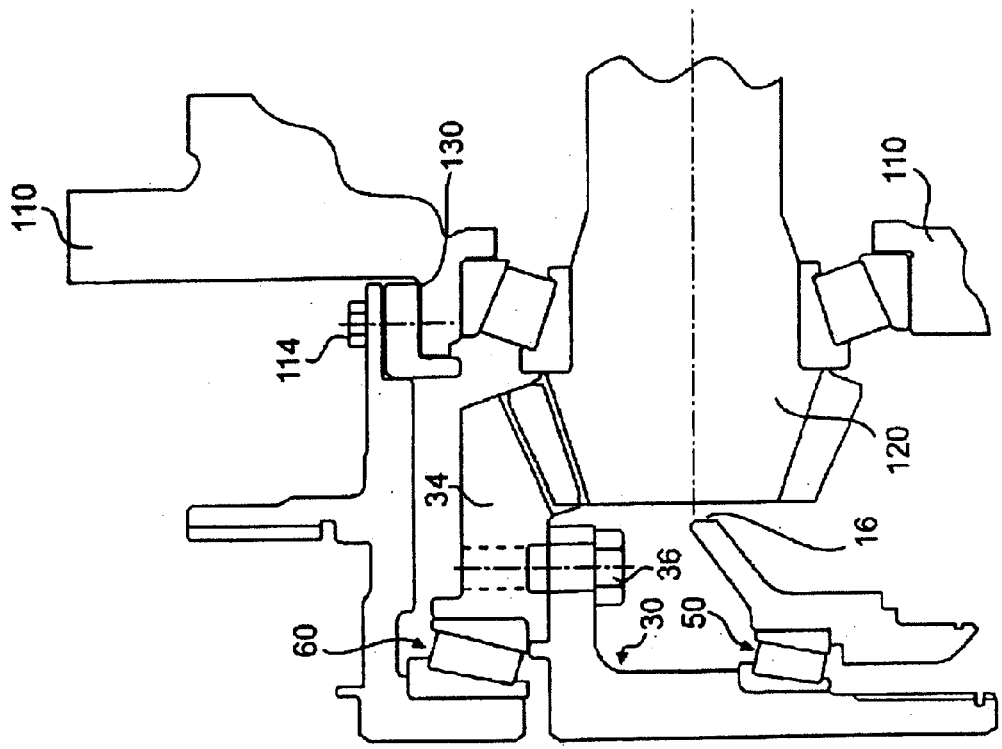
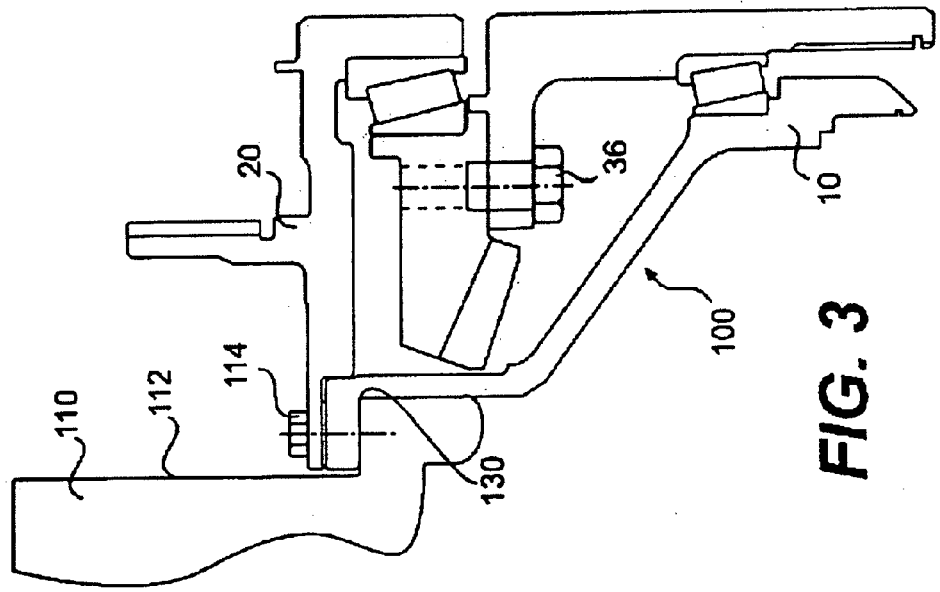
FIG. 3

BEVEL GEAR BEARING SUPPORT ARRANGEMENT MANUFACTURING METHOD

MANUFACTURING METHOD

This application relies on the benefit of priority of U.S. provisional application No. 60/311,120, filed Aug. 10, 2001.

TECHNICAL FIELD

The present invention generally relates to a method of manufacturing an arrangement including a bevel gear, bearings, and a support. In addition, the invention is also related to an arrangement formed according to the method.

BACKGROUND

Bevel gears are typically associated with a pair of tapered roller bearings providing both axial thrust loading and radial thrust loading. For example, such an arrangement is sometimes used in conventional differentials provided on vehicles, such as earth moving vehicles.

In one conventional differential arrangement, a pair of tapered bearings carrying a bevel gear are positioned in a housing by means of a pair of support members. To assemble such a structure, one of the support members is passed through a first opening on one side of the housing, and the other support member is passed through a second opening on an opposite side of the housing. The support members are bolted to the housing, and sets of shims provide the dual purpose of applying preload to the bearings and ensuring an optimum contact pattern between the bevel gear and a pinion meshed with the bevel gear.

The bearing preload is adjusted by adding or removing one or more shims to or from the subject/housing interfaces until the preload is correct. To adjust the gear contact pattern, one or more shims are removed on one side of the housing and an equal number of shims are added on an opposite side of the housing. In some factory assembly environments, this shim addition and removal requires a rather complicated and time-consuming process, wherein the housing is turned to expose its first side, one of the members is removed, a shim is added, the member is reinstalled, the housing is flipped over to expose its second side opposite to the first side, the other member is removed, a shim having thickness equal to the added shim is removed, the frame member is reinstalled, the gear contact is rechecked, and the procedure is repeated until the gear contact is correct. The process is even more complicated in non-factory settings, such as field servicing, because there are often no devices to facilitate rolling over the housing, and because the bevel gear must be supported inside the housing while the frame members are removed and the shims are changed.

U.S. Pat. No. 3,785,023 discloses a method for adjusting tapered roller bearings, wherein a tool applies a pressing force to force fit bearings in a unitary housing without using any shims. Such a method, however, requires a very specialized and expensive assembly tool. In addition, the resulting structure cannot be easily disassembled and reassembled to permit servicing of the bearings. Moreover, there is no effective way of making adjustments to the structure after the parts have been assembled together.

In light of the foregoing, there is a need in the art for improving methods associated with the assembly of a structure including a bevel gear and bearings. There is also a need for improved bevel gear and bearing arrangements. The present invention is intended to overcome one or more of the problems and disadvantages associated with the prior art.

SUMMARY OF THE INVENTION

As embodied and broadly described herein, one aspect of the invention includes a method of manufacturing. The method may involve providing a sub-unit including a shaft and a bevel gear associated with the shaft, and also providing a first support member and a second support member. A first bearing may be positioned between the sub-unit and the first support member. A second bearing may be positioned between the second support member and the sub-unit. The first support member may be connected to the second support member. Preload on the first and second bearings may be adjusted. At least the sub-unit, the first support member, the second support member, the first bearing, and the second bearing may constitute an assembly capable of being installed in a housing.

Another aspect of the invention relates to an assembly manufactured according to the method. A further aspect relates to a differential including the assembly installed in a differential housing.

Yet another aspect of the present invention includes providing an assembly including a sub-unit including a shaft and a bevel gear associated with the shaft, a first support member, a second support member connected to the first support member, a first bearing between the sub-unit and first support member, and a second bearing between the second support member and the sub-unit. This method may further include installing the assembly into a housing, wherein the installing comprises passing the assembly through a single opening in the housing.

It is to be understood that both the foregoing general description and the following detailed description are exemplary.

BRIEF DESCRIPTION OF THE DRAWINGS

The accompanying drawings are included to provide a further understanding of optional aspects of the invention and are incorporated in and constitute a part of this specification. The drawings illustrate various aspects of an optional embodiment of a method according to the invention and, together with the description, serve to explain some optional principles of the invention. In the drawings.

FIG. 3 is a schematic cross-section view taken along a plane slightly different from that of FIGS. 1 and 2, showing the assembly being installed in a differential housing;

DETAILED DESCRIPTION

Figure 1:
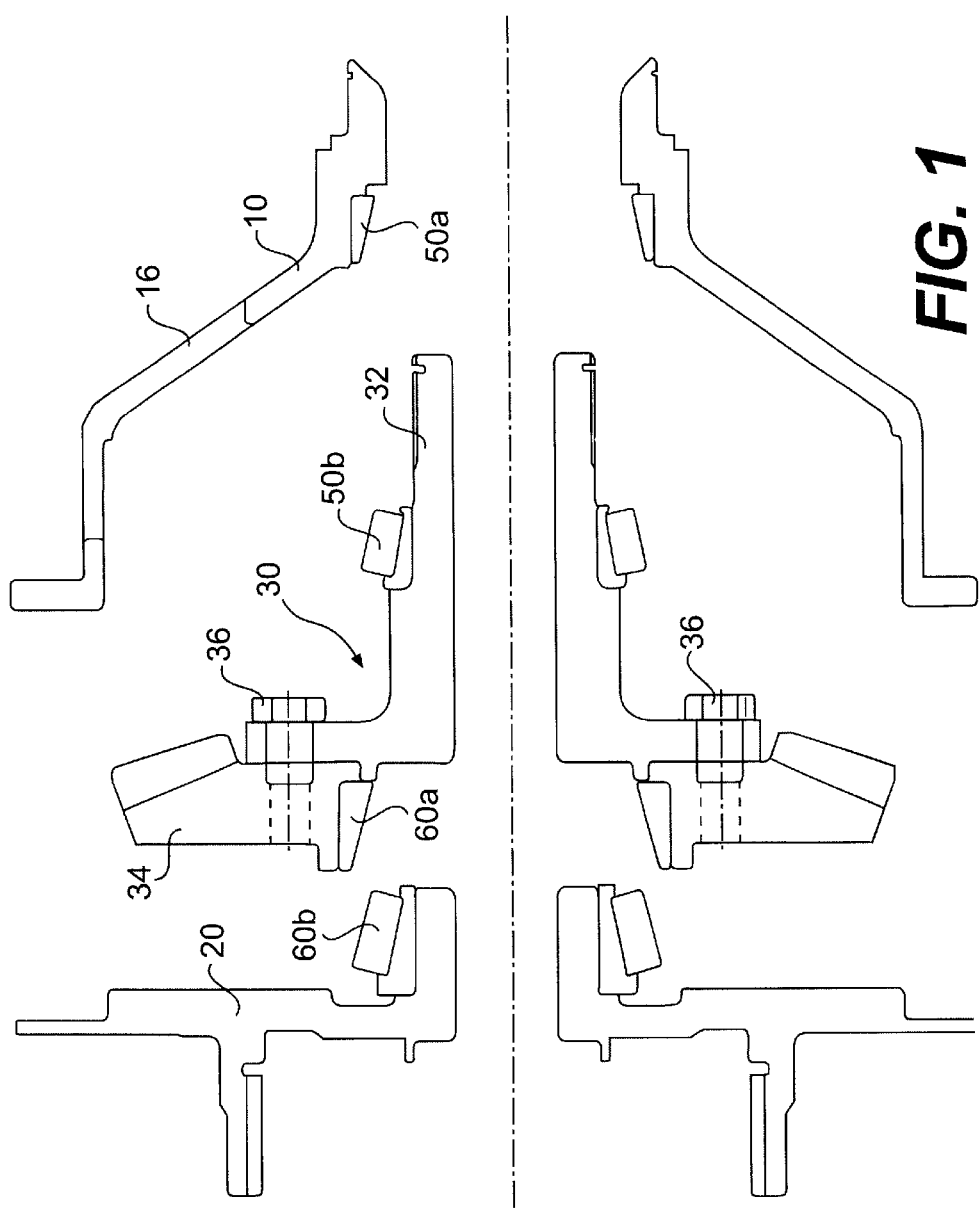
FIG. 1 is a schematic cross-section view showing separate components for assembly in a method in accordance with an embodiment of the invention.

Reference will now be made in detail to exemplary embodiments of the invention, examples of which are illustrated in the accompanying drawings. Wherever possible, the same reference symbols are used in the drawings and the description to refer to the same or like parts.

FIG. 1 shows a first stage of a method in which components are assembled together to form an assembly. The components shown in FIG. 1 include a first support member 10, a second support member 20, and a sub-unit 30 including a shaft 32 and a bevel gear 34. If the shaft 32 and the bevel gear 34 are separate pieces not already assembled together to form the sub-unit 30, one of the initial steps of the method may include connecting the shaft 32 and the bevel gear 34 to one another, for example, by engaging threaded fasteners 36, such as bolts, in threaded holes of the bevel gear 34. Alternatively, the sub-unit 30 may be provided in a pre-assembled form, or the sub-unit could be an integral one-piece arrangement lacking an interconnection of separate parts.

As shown in FIG. 1, first and second bearing portions 50a and 50b are pressed in contact with the first support member 10 and the shaft 32 of the sub-unit 30, respectively. Similarly, third and fourth bearing portions 60a and 60b are pressed in contact with the bevel gear 34 and the second support member 20, respectively.

Figure 2:
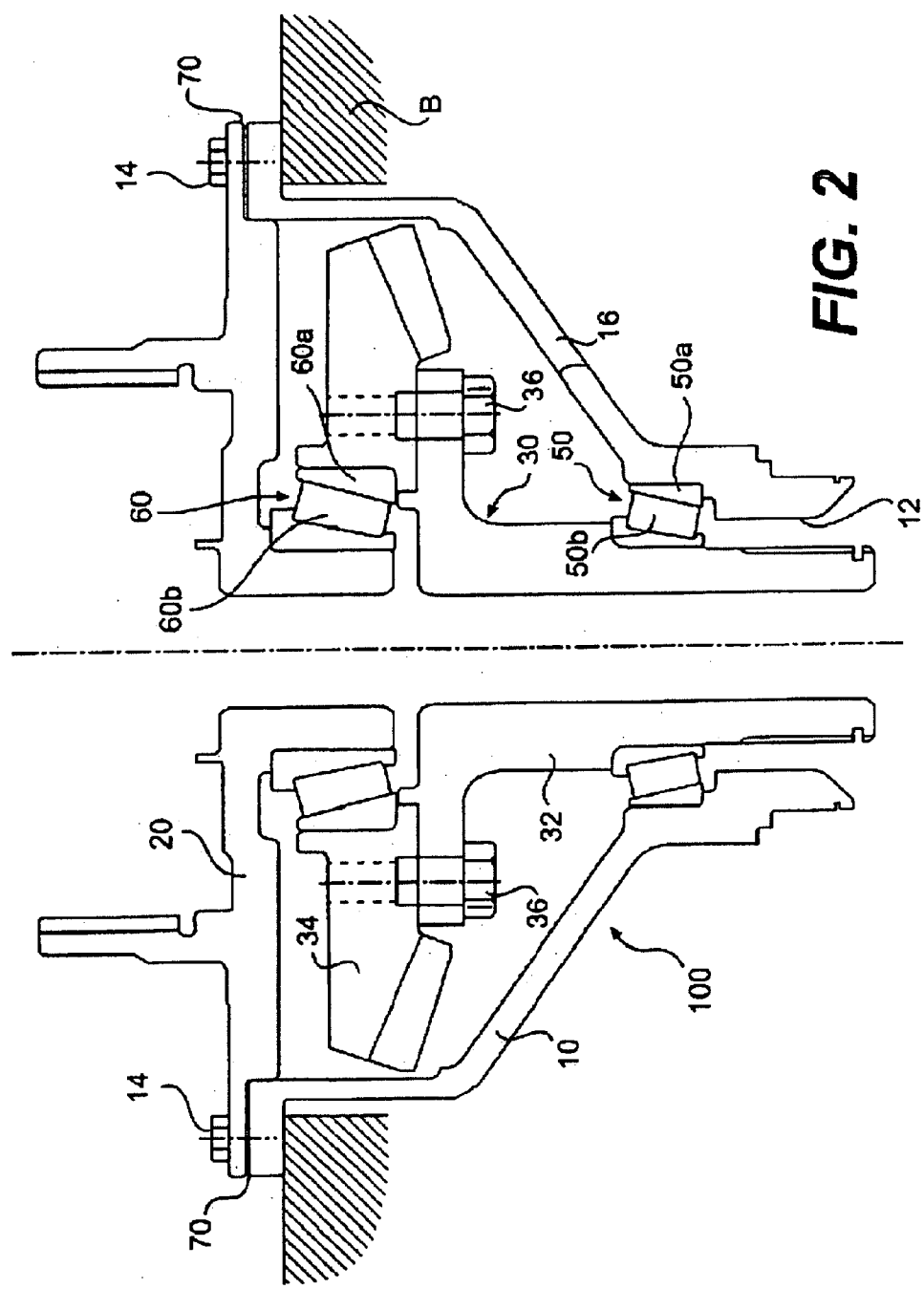
FIG. 2 is view similar to that of FIG. 1 showing housing members connected together to form an assembly.

FIG. 2 shows a subsequent stage in the method. As shown in this figure, the sub-unit 30 is placed between the first and second support members 10 and 20 so that the shaft 32 extends into an opening 12 in the first support member 10. The first and second support members 10 and 20 are then connected to one another, for example, by threaded fasteners 14 engaging threaded holes in the first support member 10. In the example shown in the drawings, the threaded fasteners 14 could be three bolts (only two are shown in FIG. 2).

As shown in FIG. 2, the first and second bearing portions 50a and 50b cooperate with one another to form a first bearing 50 positioned between the first support member 10 and the shaft 32, and the third and fourth bearing portions 60a and 60b cooperate with one another to form a second bearing 60 positioned between the second support member 20 and the bevel gear 34. In the exemplary embodiment shown in the drawings, the first bearing 50 is a tapered roller bearing, and the second bearing 60 is also a tapered roller bearing. For example, the first and third bearing portions 50a and 60a are tapered bearing cups, the second and fourth bearing portions 50b and 60b are tapered bearing cones.

Alternatively, there could be a number of other possible bearing arrangements. For example, the portions could be switched so that the first and third bearing portions are bearing cones and the second and fourth bearing portions are bearing cups (not shown). In another alternative example, the bearing portions could be preformed together so that entire bearings, rather than portions, could be initially placed between the support members 10 and 20 and the sub-unit 30. In addition, bearings other than tapered roller bearings may be utilized.

The method may further include adjusting the preload on the first and second bearings 50 and 60. In the example shown in the drawings, bearing preload shims 70 are positioned between the first and second support members 10 and 20. Each of the shims 70 may be shaped in the form of a ring. To adjust the preload on the bearings 50 and 60, one or more of the shims 70 may be added to and/or removed from between the first and second support members 10 and 20.

There are many alternative ways in which the bearing preload adjustment might take place. For example, spacers or locknuts could be used in place of the shims or in combination with the shims. Alternatively, the threaded fastening of the first and second housing members 10 and 20 could be arranged to allow for bearing preload adjustment. The bearing preload could be adjusted in any manner known in the art.

The associated components shown in FIG. 2 comprise an example of an assembly 100.

In an exemplary practice of the method of this invention, each of the above-mentioned method aspects described in connection with FIGS. 1 and 2 could take place while one or more of the components of the assembly 100 are placed "on a bench" B providing a temporary supporting structure for the component(s). As used herein, the phrase "on a bench" is intended to include a work bench or any other area or structure where assembly of the components might take place, other than the location in which the assembly 100 will ultimately be installed. For example, when the assembly 100 is intended to be installed in a differential housing, the location of the "bench" B would not be located within the differential housing.

FIG. 3 shows a further stage in the exemplary embodiment of the method. As shown in this figure, the assembly 100 is installed into a housing 110 (for ease of illustration, only a portion of the housing 110 is shown in FIG. 3).

When the method is practiced in a factory, for example, the assembly 100 could be installed into the housing 110 at the same facility where the assembly 100 is formed. In one exemplary method, the assembly 100 could be pre-assembled at a location differing from the location where the assembly 100 is eventually installed into the housing 110.

In the exemplary embodiment shown in FIG. 3, the assembly 100 is installed into the housing 110 by passing the assembly 100 though a single side opening 112 of the housing 110. For example, the opening 112 could be a left hand bore of the housing 110, and while the assembly 100 is passed through the opening 112, the housing 110 could be oriented so that this bore is directed vertically upwards.

After the assembly 100 is passed into the housing 110, the assembly 110 may be connected to the housing 110, for example, through the use of threaded fasteners 114, such as bolts, engaged in threaded holes provided in the housing 110. (FIG. 3 does not show the fasteners 14 and shims 70 of FIG. 2 because FIGS. 2 and 3 are taken along different planes.)

Optionally, the housing 110 is a differential housing associated with a vehicle, and the combination of the assembly 100 and the housing 110 comprises at least a bevel gear set portion of a differential. As shown in the example of FIG. 3, a pinion gear 120 is provided in the housing 110, and the installation of the assembly 100 in the housing 110 includes placing teeth of the bevel gear 34 in engagement with teeth of the pinion gear 120. The first support member 10 may include a pinion gear passage 16 permitting the pinion 120 to partially extend into the interior of the assembly 100 and engage the bevel gear 34, as shown in FIGS. 3 and 5.

Another optional aspect of the method involves adjusting the contact between the bevel gear 34 and the pinion gear 120. This adjustment could take place in any manner known in the art. In the example shown in the drawings, the gear contact is adjusted through the use of one or more gear contact shims 130. The adjustment could include adding one or more shims 130 between the assembly 100 and the housing 110 and/or removing one or more of the shims 130.

Figure 5:
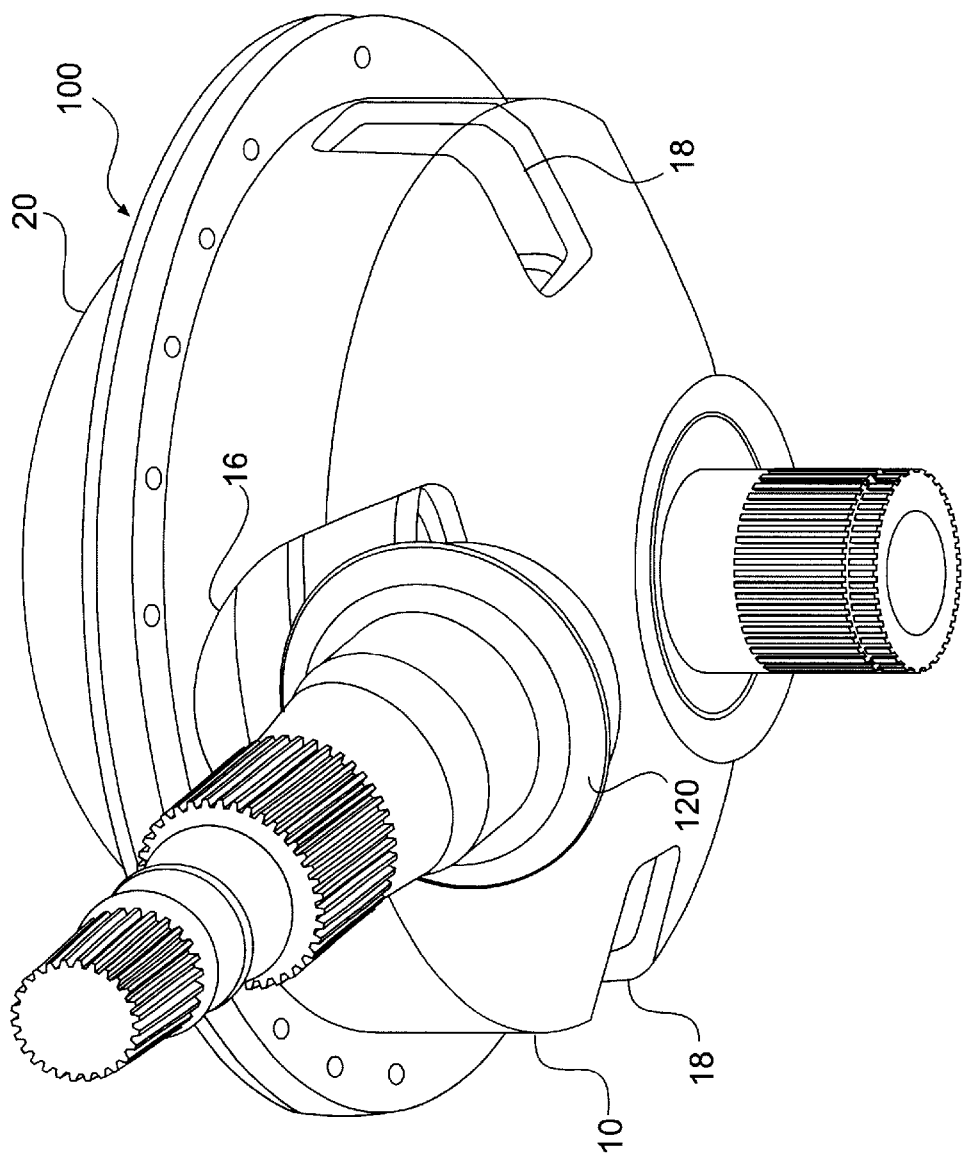
FIG. 5 is a perspective view showing the assembly (positioned outside of the housing) along with a pinion gear passing through an opening in the assembly.

During the gear adjustment, the backlash between the bevel gear 34 and the pinion gear 120 could be measured through one or more housing cutouts 18 shown in FIG. 5. Optionally, these cutouts 18 are defined at least partially by the first support 10, and they are formed during casting of the first support 10. In addition to permitting gear backlash measurement, the cutouts 18 may also provide clearance for other parts in the housing 110.

Since the set of gear contact shims 130 are separate from the bearing preload shims 70 in the example shown in the drawings, the gear contact adjustment can be separate from the bearing preload adjustment. With such an arrangement, the gear contact adjustment can take place after the bearing preload adjustment in a manner that does not impact the bearing preload.

Figure 4:
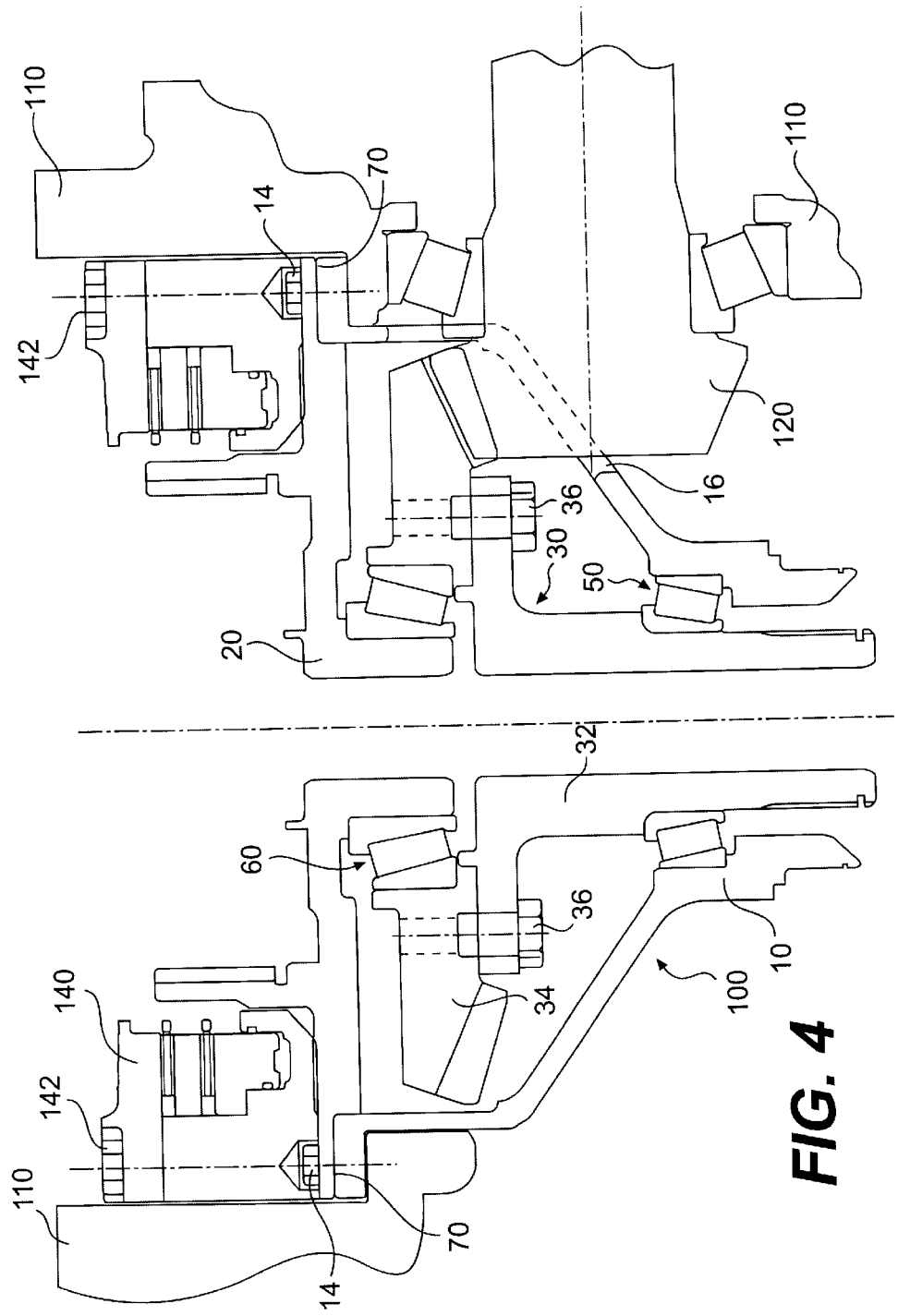
FIG. 4 is a view similar to that of FIG. 3 showing installation of a brake unit in the housing.

FIG. 4 shows an example of a further optional stage in the method. As shown in this figure, a brake unit 140 could be installed in the housing 110 by means of threaded bolts 142 passing through the brake unit 140, second support 20, first support 10, and, optionally, some of the bearing preload shims 70, before being engaged in threaded holes in the housing 110.

When the housing 110 is a differential housing, FIG. 4 shows an example of a portion of a differential including the assembly 100 installed in the housing 110.

INDUSTRIAL APPLICABILITY

Methods and devices according to the present invention have a broad range of industrial applicability. As mentioned above, the method and devices could be associated with differentials for vehicles, such as differentials for earth moving vehicles or other forms of agricultural or construction vehicles, for example.

At least certain stages of the methods could be performed either in a factory setting or in a non-factory setting (e.g., at a field servicing location). Similarly, devices formed in the disclosed methods could be installed in vehicles or portions of vehicles in either a factory setting or a non-factory setting.

The present invention may have many optional advantages. For example, the method in accordance with the invention may simplify a bearing adjustment process and/or a gear adjustment process.

Another optional advantage may relate to forming the assembly on a bench without rolling the housing over several times during bearing adjustment. Similarly, one other optional advantage relates to adjusting the gear contact without turning the housing.

Optionally, the component parts of the assembly may be smaller. A further optional advantage relates to faster assembly of components and improved bearing and gear adjustments.

Other optional advantages include reducing disassembly and reassembly in adjustment procedures, improving the speed of servicing bevel gears in the field, reducing handling of parts during field servicing, and limiting the possibility of part damage or injury to service technicians.

Of course, many aspects of the invention could be practiced without necessarily accomplishing one or more of these advantages.

The embodiments described above are exemplary only. It will be apparent to those skilled in the art that various modifications and variations can be made to the methodology and structure described herein. In view of the foregoing, it is intended that the present invention cover numerous modifications and variations.

What is claimed is:

1. A method of manufacturing, comprising:
   providing a sub-unit including a shaft and a bevel gear associated with the shaft;
   providing a first support member and a second support member;
   positioning a first bearing between the sub-unit and the first support member;
   positioning a second bearing between the second support member and the sub-unit;
   connecting the first support member to the second support member; and
   adjusting preload on the first and second bearings,
   wherein at least the sub-unit, the first support member, the second support member, the first bearing, and the second bearing constitute an assembly capable of being installed in a housing.

2. The method of claim 1, wherein the first and second bearings are tapered bearings.

3. The method of claim 2, wherein each of the bearings includes a cup portion and a cone portion, wherein the positioning of the first bearing includes placing one of the cup portion and the cone portion of the first bearing in contact with the sub-unit and placing the other of the cup portion and the cone portion of the first bearing in contact with the first support member, and wherein the positioning of the second bearing includes placing one of the cup portion and the cone portion of the second bearing in contact with the sub-unit and placing the other of the cup portion and the cone portion of the second bearing unit in contact with the second support member.

4. The method of claim 3, wherein the cup portion of the first bearing is placed in contact with the first support member, wherein the cone portion of the first bearing member is placed in contact with the shaft, wherein the cup portion of the second bearing is placed in contact with the bevel gear, and wherein the cone portion of the second bearing is placed in contact with the second support member.

5. The method of claim 1, further including comprising forming the sub-unit by connecting the bevel gear to the shaft.

6. The method of claim 1, wherein the adjusting of the preload includes at least one of adding at least one shim in a position between the first and second supports members and removing at least one shim from a position between the first and second support members.

7. The method of claim 1, further including installing the assembly into a housing.

8. The method of claim 7, wherein the installing includes passing the assembly into the housing through a single opening in the housing.

9. The method of claim 8, wherein the housing is a differential housing attached to a vehicle.

10. The method of claim 7, wherein a pinion gear is provided in the housing, and wherein the method further includes placing the bevel gear in engagement with the pinion gear, and adjusting contact between the bevel gear and the pinion gear.

11. The method of claim 10, wherein the adjusting of the contact between the bevel gear and the pinion gear includes at least one of adding at least one shim in a position between the assembly and the housing and removing at least one shim from a position between the assembly and the housing.

12. The method of claim 11, wherein the adjusting of the contact between the bevel gear and the pinion gear is separate from the adjustment of the preload on the first and second bearings.

13. The method of claim 7, wherein the adjusting of the preload on the bearings occurs prior to inserting the assembly into the housing.

14. The method of claim 7, further including installing a brake in the housing.

15. The method of claim 7, wherein the installing of the assembly in the housing includes fastening the assembly and the housing together with at least one threaded fastener.

16. The method of claim 1, wherein the connecting of the first support member to the second support member includes fastening the first support member and the second support member together with at least one threaded fastener.

17. The method of claim 1, wherein the positioning of the first bearing, the positioning of the second bearing, and the adjusting occur on a bench.

18. An assembly manufactured according to the method of claim 1 wherein the assembly is configured to be installed in a housing.

19. A differential comprising:
a differential housing; and
the assembly of claim 18 installed in the housing.

20. A method of manufacturing, comprising:
providing an assembly including:
  a sub-unit including a shaft and a bevel gear associated with the shaft,
  a first support member,
  a second support member connected to the first support member,
  a first bearing between the sub-unit and first support member, and
  a second bearing between the second support member and the sub-unit; and
installing the assembly into a housing, wherein the installing includes passing the assembly through a single opening in the housing.

* * * * *